Nov. 23, 1965   K. HUGENTOBLER   3,219,382
HANDLING DEVICE FOR SOFT OBJECTS
Filed March 15, 1963

3,219,382
HANDLING DEVICE FOR SOFT OBJECTS
Kurt Hugentobler, Onex, Geneva, Switzerland, assignor to Georges Lesieur & ses Fils, Paris, France, a corporation of France
Filed Mar. 15, 1963, Ser. No. 265,539
Claims priority, application Switzerland, Mar. 15, 1962, 3,092/62
15 Claims. (Cl. 294—81)

This invention relates to a device for handling pressure sensitive or soft objects.

In several industrial processes objects which, in their final state, are hard or relatively insensitive to pressure, pass through an intermediate state in which they are permenently deformable or soft. This is the case, in particular, with objects which are molded from a paste or, for example, a suspension of fibrous matter such as paper pulp. After being molded, these objects have just the consistency required to hold their form, but cannot withstand local constraints such as those imposed upon them by conventional handling devices such as pincers. There is thus a need, particularly in automatic machines, for special apparatus capable of handling these objects delicately in the course of operations such as transfer, change of position, displacement, etc., required during manufacture up to the point when these objects become more resistant to effects of handling.

This invention concerns a handling device which fulfills these requirements. The device is distinguished by the fact that it is designed to grip a pressure sensitive or soft object and that the device has a rigid frame, and a plurality of object gripping and inflatable elastic means each having an inflatable portion fixed to the aforementioned rigid frame and capable of being inflated by the injection at low pressure of a compressible fluid such that a gripping portion of the corresponding object gripping and inflatable elastic means comes into contact with the object.

The attached drawing represents by way of examples various constructional forms of devices in accordance with this invention.

Figure 1:
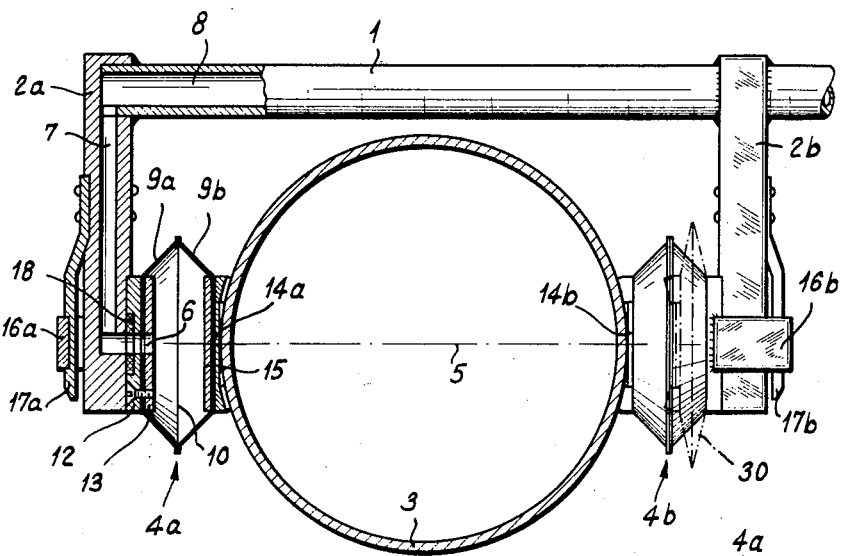
FIG. 1 is a plan partially in section of a first embodiment of a handling device.

The device shown in FIG. 1 is designed to grip an object 3 externally of the object and comprises a support which includes a rigid frame 1 having at least two arms such as $2_a$ and $2_b$. Between the latter two arms and the object 3 are disposed inflatable members such as the cIshions $4_a$ and $4_b$, one on each arm. The cushions can be expanded each in a corresponding gripping direction along the center line 5 while the cushions are reinforced to have some rigidity in other directions. The interior of each cushion communicates through an opening such as 6 with a passageway 7 extending, for example, through the interior of each arm $2_a$ and $2_b$ and a central duct 8. The duct 8 is connected to a source of fluid at low pressure, for example, low-pressure compressed air. Each cushion is formed of two flexible wall portions or membranes, for example of an elastomer such as rubber, which membranes $9_a$ and $9_b$ are bonded face to face, as with adhesive, along their edges 10. The first membrane $9_a$ is locally clamped between an external reinforcing base plate 12 and a fixing plate 13 internally of the cushion, both plates having radial dimensions less than those of the clamped membrane. Membrane $9_a$ and plates 12 and 13 are pierced to provide orifice 6. Membrane $9_b$ is locally stiffened by reinforcement in the form of an interior brace 15 and carries on its exterior at least one flexible contact member $14_a$, having a form corresponding to the exterior form of the object 3. Brace 15 also has radial dimensions less than those of membrane $9_b$. The cushion $4_b$ is constructed in the same manner. Due to this construction, the cushions have flexibility mainly in a direction perpendicular to the base plate 12 and are to a limited extent stiffened in all other directions. The base plate 12 is secured to a U-shaped extension such as $16_2$, which is slipped over the extremity of arm $2_a$ and held in place by a transversely notched spring catch $17_a$, the orifice 6 coinciding with the end of passageway 7 and a gasket 18 ensuring the sealing due to the force exerted by the catch.

The device functions as follows:

With cushions $4_a$ and $4_b$ being deflated, as shown by the broken lines 30 in the instance of cushion $4_b$, the rigid frame 1 is positioned so that contact members $14_a$ and $14_b$ are on opposite sides of the object 3. By means of compressible fluid injected under pressure through the passageway of frame 1 and through orifices 6, the cushions $4_a$ and $4_b$ are inflated so that the object 3 is gripped by the contact members $14_a$ and $14_b$.

The force exerted by the contact members can be adjusted with the delicacy desired, by adjusting the pressure of the fluid, and this permits the gripping force to be very carefully regulated.

The construction of the cushions so that they inflate principally in a direction along the line 5, normal to their surface of contact with the object 3 while having some rigidity in the plane perpendicular to this direction, avoids undue movement of the object in any sense relative to the rigid frame 1, under the effect of accelerations and decelerations occurring in the course of movements of the handling device. The releasable securement of the cushions to arms $2_a$ and $2_b$ by the U-shaped extensions $16_a$ and $16_b$ and the catches $17_a$ and $17_b$ allows the object gripping and inflatable means to be changed rapidly to permit the handling system to be used to grip objects of various shapes. Other object gripping and inflatable means varying for example in shape of the contact members $14_a$ and $14_b$ may thus be substituted better to suit the shape of the object which is to be gripped.

To stiffen the cushions $4_a$ and $4_b$ in any direction other than normal to the surface of the object, other means of course may be used than the contact member $14_a$ and the interior brace 15.

Figure 3:
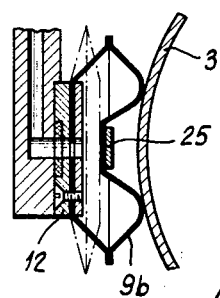
FIGS. 3 and 4 each represent details of modification applying for example to parts of FIG. 1.

One can, for example, restrict the central portion of the cushions $4_a$ and $4_b$ each by a rigid stirrup such as 25 (FIG. 3), fixed to the external base plate 12. This stirrup prevents a central zone of the mobile wall portion $9_b$ of the cushion from deforming, while permitting the rest of the wall portion to inflate and engage the object 3. In place of a single stirrup 25, one can envisage several spaced stirrups arranged so that free zones of the mobile wall portion bulge out into engagement with the object 3.

Figure 4:
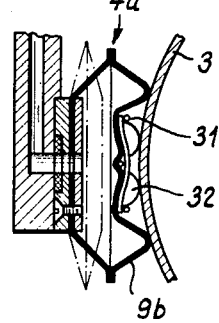

The cushions $4_a$ and $4_b$ alternatively cooperate with a shield or grip 31 (FIG. 4) having opening which are made sufficiently large so that when the cushion is inflated the mobile wall portion $9_b$ of the cushion locally distends through these openings as seen at 32 to come into contact with the object 3.

Figure 2:
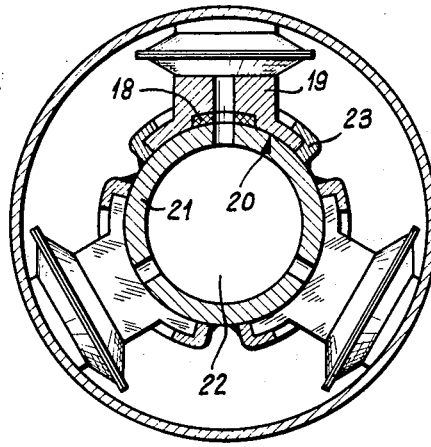
FIG. 2 is a plan partially in section of another one of the handling devices.

In the handling device shown in FIG. 2, the object gripping and inflatable means engage the interior of the object. The construction is such that inflation for gripping is in directions which are radially outward. In order to allow this, the base plate 12 is replaced by a base plate 19 having a semi-cylindrical profile 20 permitting it to follow the external surface of a central frame 21 which replaces the rigid frame 1 and its arms $2_a$ and $2_b$ of FIG. 1. The central frame 21 has a passageway 22.

The object gripping and inflatable means in FIG. 2 are maintained in place by any suitable means, such as the slideways 23, precautions being taken to ensure sealing engagement of the gaskets 18 with the frame 21.

In the examples described, each cushion includes two flexible wall portions or membranes fixed edge to edge as by an adhesive. By way of alternative, each cushion may include a length of flat tubing made of elastic material such as rubber, the opposite ends of opposed wall portions of which tubing being closed off. In this case the cushion illustratively has a quasi-rectangular outline.

What is a claimed is:

1. In an object handling device, the combination which comprises a support, and a plurality of opposed object gripping and inflatable means, each of said object gripping and inflatable means including, inflatable means having first and second opposed end walls, said second end wall including a flexible portion for distending and a mounting for said flexible portion secured to said support and located substantially centrally of said flexible portion and said end walls each having outer interfacially opposed peripheral portions interconnected to each other in order for said inflatable means to elongate endwise in a gripping direction, and said end walls extending movably clear of said support transversely of said gripping direction when moving in said gripping direction, and each of said object gripping and inflatable means including object gripping means on said first end wall of said inflatable means and moving with said first end wall, said object gripping means comprising a gripping face moving in said gripping direction for gripping an object.

2. In an object handling device, the combination of claim 1, wherein said gripping faces move in gripping directions oppositely toward each other for gripping an object.

3. In an object handling device, the combination of claim 1, wherein said gripping faces move in gripping directions oppositely away from each other for gripping a hollow object.

4. In an object handling device of claim 1, wherein said mounting in at least one of said inflatable means has rigidity and includes a facial portion of said second wall, said facial portion extending transversely of said gripping direction and substantially centrally stiffening said second end wall.

5. In an object handling device of claim 1, wherein said first end wall in at least one of said object gripping and inflatable means has reinforcement substantially centrally thereof and an outwardly extending flexible portion for moving with said reinforcement, and said reinforcement supports said gripping face.

6. In an object handling device, the combination of claim 1, wherein said mounting in at least one of said inflatable means has rigidity and includes a facial portion of said second wall, said facial portion extending transversely of said gripping direction and substantially centrally stiffening said second end wall, and said mounting having an opening therein leading from the outside of said inflatable means into the space between said opposed ends walls for fluid to be supplied.

7. In an object handling device, the combination of claim 6, wherein said support includes a passageway, and said opening in said mounting communicates with said passageway.

8. In an object handling device, the combination of claim 7, wherein said support and said mounting include interengaging portions for detachably securing said mounting to said support and detachably coupling said opening and said passageway.

9. In an object handling device, the combination of claim 1, wherein in at least one of said inflatable means said first and second end walls of said inflatable means are both flexible.

10. In an object handling device, the combination of claim 9, wherein a stirrup extends across said flexible first end wall, and portions of said flexible first end wall are disposed for distending from opposite sides of said stirrup while said stirrup locally restricts movement of said flexible first end wall in said gripping direction.

11. In an object handling device, the combination of claim 9, wherein a grid member having spaced openings therein extends across said flexible first end wall, and portions of said flexible first end wall are situated and aligned with said openings for distending through said openings while said grid member locally restricts movement of said flexible first end wall in said gripping direction.

12. In an object handling device, the combination which comprises a support, and a plurality of opposed object gripping and inflatable means, each of said object gripping and inflatable means including, inflatable means having first and second opposed end walls and an interior, said second end wall including a flexible portion for distending and a mounting for said flexible portion secured to said support and located substantially centrally of said flexible portion, said mounting having an opening therein leading from the outside of said inflatable means to the interior of said inflatable means for fluid to be supplied and said end walls each having outer interfacially opposed peripheral portions interconnected to each other in order for said inflatable means to elongate endwise in a gripping direction, and said end walls extending movably clear of said support transversely of said gripping direction when moving in said gripping direction, and each of said object gripping and inflatable means including object gripping means on said first end wall of said inflatable means and moving with said first end wall, said object gripping means comprising a gripping face moving in said gripping direction for gripping an object.

13. In an object handling device, the combination of claim 12, wherein said gripping faces move in gripping directions radially from a passageway in said support, and said openings communicate with said passageway.

14. In an object handling device, the combination which comprises a support, and a plurality of opposed object gripping and inflatable means, each of said object gripping and inflatable means including, inflatable means having first and second opposed end walls respectively including first and second opposed membranes for elongating endwise in a gripping direction, said second end wall having substantially centrally of said second membrane a mounting secured to said support and said first and second membranes having outer portions and an interconnection securing said outer portions to each other to diverge interfacially from said interconnection as an apex when said inflatable means in elongating in said gripping direction, and each of said object gripping and inflatable means incluuding object gripping means on said first end wall of said inflatable means and moving with said first membrane, said object gripping means comprising a gripping face moving in said gripping direction for gripping an object.

15. In an object handling device, the combination of claim 14, wherein at least one of said inflatable means said outer portions of said membranes are annular portions and are interconnected to form an annular apex.

References Cited by the Examiner

UNITED STATES PATENTS

| | | | |
|---|---|---|---|
| 484,367 | 19/1892 | Hicks | 5—348 |
| 1,561,184 | 11/1925 | Offenhauser | 5—348 |
| 2,247,168 | 6/1941 | Fontaine. | |
| 2,369,736 | 2/1945 | Hurt | 5—348 |
| 2,611,612 | 9/1952 | Schmidt. | |
| 2,784,997 | 3/1957 | Baumann | 294—88 |

FOREIGN PATENTS 1,044,075  6/1953  France.

M. HENSON WOOD, JR., *Primary Examiner.*

ANDRES H. NIELSEN, ROBERT B. REEVES,
*Examiners.*